Figure 1:
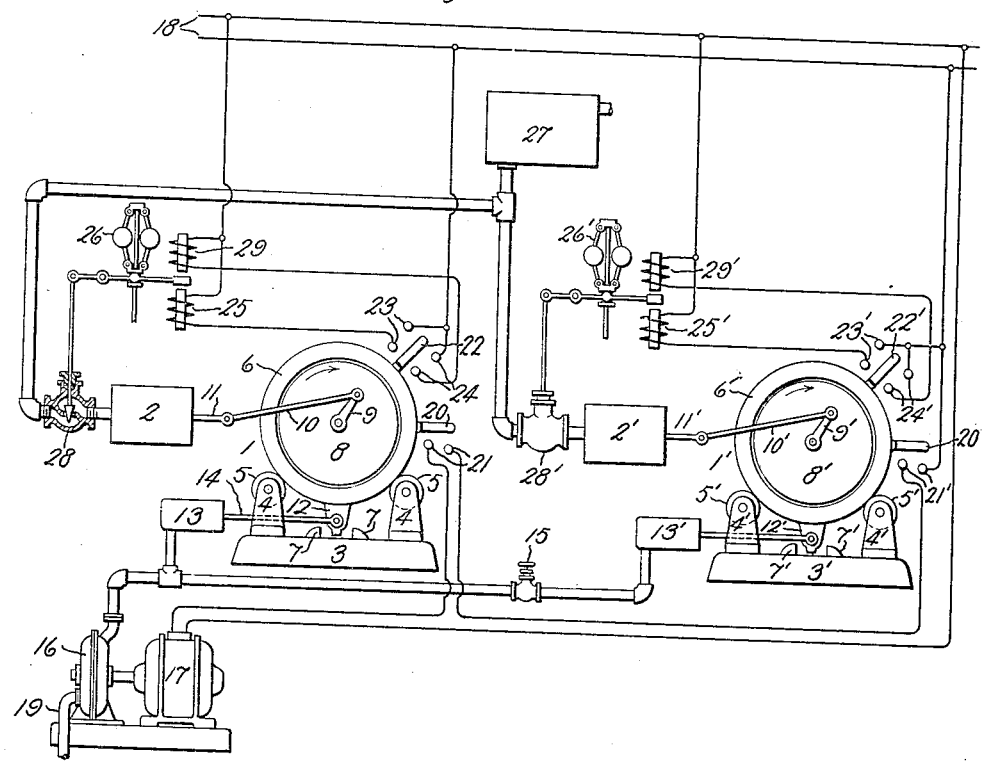

Jan. 10, 1928.

C. MACMILLAN 1,655,469

POWER SYSTEM

Filed April 27, 1923

Inventor:
Campbell Macmillan,
by Alexander S. June
His Attorney

Patented Jan. 10, 1928.

1,655,469

UNITED STATES PATENT OFFICE.

CAMPBELL MACMILLAN, OF SCHENECTADY, NEW YORK, ASSIGNOR TO GENERAL ELECTRIC COMPANY, A CORPORATION OF NEW YORK.

POWER SYSTEM.

Application filed April 27, 1923. Serial No. 635,112.

My invention relates to power systems and especially to systems of electric ship propulsion in which a plurality of prime movers such as Diesel engines or steam turbines are utilized to drive the generators which supply power to the propeller motor.

In the application of the high speed Diesel engine to ship propulsion it has been found desirable to generate the power in several units of moderate size for the purpose of securing greater flexibility in the installation of the system and adding to the reliability of its operation. The majority of cargo boats, however, operate best when provided with a single large propeller and, if this propeller is to be driven by a single motor of suitable size supplied with current from the various generating units, there is encountered the difficulty of operating in parallel a number of generating machines driven by prime movers subject to variations in speed and driving torque.

The principal objections to parallel operation of the generators result from the fact that large circulating currents are produced by speed variations of the different generators and by the relative mechanical phase displacements of the different generator rotors even before any actual difference in speed is established. If a plurality of generators driven by internal combustion engines are operated in parallel and for any reason, such as the misfiring of one of the cylinders for example, the speed of one is momentarily decreased, there is produced a resultant electromotive force which sends a circulating current around the closed circuit formed by the parallel connected machines. This circulating current increases the load on the machines operating at normal speed and lightens the load on the low speed machine thereby tending to equalize the speeds of the various machines and to reduce the circulating currents to zero. Due, however, to the inertia of the machines and to the speeding up action of the low speed machine governor, the position of zero circulating current is passed and circulating currents now flowing in the opposite direction again tend to pull the machines together.

The frequency of this swinging or hunting is determined by the natural vibration period of the machines. Hunting may be greatly reduced by designing the machines so as to avoid mechanical resonance at any frequency within the range of frequencies at which the system is normally operated and by depending on the effect of circulating currents to pull a machine into synchronism when its speed is reduced below normal for any reason. It is desirable, however, to provide means for restoring synchronism between the generating units without the flow of any considerable circulating currents between them. In accordance with my invention the generator stator members are arranged to rotate within a limited range, and this slight movement is utilized to hasten the action of the engine governor, thereby insuring a prompt supply of fuel to the engine and preventing the reduction in speed which would otherwise occur.

An object of my invention is to provide a power system wherein a plurality of generators, each driven by a prime mover subject to variations in its speed, may be operated in parallel without the production of objectionable circulating currents.

A further object is to provide means independent of circulating currents for maintaining synchronism between a number of generators operated in parallel.

A further object is to provide a system of ship propulsion in which a number of generators driven by Diesel engines or like prime movers may be effectively operated in parallel for the purpose of supplying power to a single propeller motor.

A further object of my invention is to provide anti-hunting means for producing between the rotating members of parallel connected generators corrective forces of approximately constant value as distinguished from those produced by circulating currents which are proportional to the departure of the generator rotors from normal relation with each other.

My invention will be better understood from the following description taken in connection with the accompanying drawing and its scope will be pointed out in the appended claims.

Figure 2:
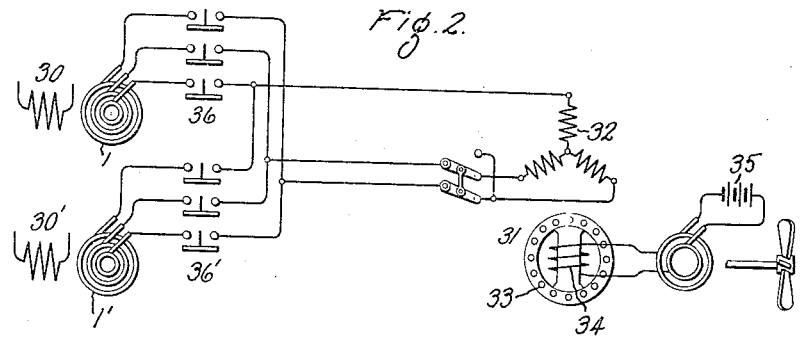

Referring now to the drawing there is shown in Fig. 1 a plurality of generators and prime movers interrelated to operate in accordance with my invention, and in Fig. 2 a schematic view of the electrical connections in a ship propulsion system in connection with which my invention may be utilized. Since each of the generating units shown in Fig. 1 are provided with similar parts, only one of the units will be described in detail and the corresponding parts of the two units will be indicated by the same reference numeral, the numerals applied to one unit being primed.

Fig. 1 shows a generator 1 arranged to be driven by an internal combustion engine 2 and mounted upon a base 3 which is provided with upright members 4 upon which are mounted rollers 5 arranged to cooperate with the stator member 6 of the generator 1 in such manner as to permit the stator member to rotate within a limited range determined by the stops 7 mounted on the base 3. The rotor member 8 of the generators 1 is operatively associated with the cylinder of the engine 2 through the crank 9, the connecting rod 10 and the piston rod 11. The generator stator member 6 is provided with an extension 12 arranged to cooperate with a hydraulic cylinder 13 through a rod 14. Interconnecting the hydraulic cylinders 13 and 13' is a pipe provided with a valve 15 and arranged to provide a hydraulic connection between the stators 6 and 6' whereby a predetermined difference in the torques produced by the different generators may be utilized to rotate the generator having the weaker torque through a limited range for the purpose of bringing into action agencies adapted to hasten the supply of fuel to the engine driving this low torque generator. The work performed by a single stroke is less than that required to transfer the energy of one cylinder explosion from one unit to another.

A pump 16 operated by a motor 17 arranged to be supplied with current from a source 18 is provided for the purpose of replacing leakage and maintaining the pressure within the cylinders 13 at a proper value. The pump 16 may be supplied with oil or other suitable liquid through a pipe 19 connected to a reservoir (not shown). Upon the stator member of generator 1 is mounted a contact member 20 arranged to interconnect the contacts 21, and cooperating with the generator 1' is a like contact member 20' arranged to interconnect the contacts 21'. The contacts 21 and 21' together with their cooperating contact members 20 and 20' are so arranged that current is supplied to the motor 17 only when the fluid in the hydraulic system has been reduced by leakage, or otherwise, to a point at which contacts 20 and 20' are not maintained out of contact with their corresponding contact members.

Upon the generator stator member 6 is also mounted a contact member 22 arranged to interconnect the contacts 23 when the speed and torque of the corresponding generator is below normal and to interconnect the contacts 24 when its speed is above normal. Through the contacts 23 and the member 22 an electromagnet 25 is connected with the power source 18 for the purpose of supplementing the action of the engine governor 26 and hastening the supply of fuel to the engine 2 from the supply tank 27 through the control valve 28. An electromagnet 29 is provided for retarding the supply of fuel to the engine in like manner when the torque of the corresponding machine is above normal.

In Fig. 2 the generators 1 and 1' are illustrated as provided with field windings 30 and 30' adapted to be supplied with current from any suitable source. These generators are arranged to supply power to a propeller motor 31 having a primary winding 32 and a secondary member provided with squirrel cage 33 and an exciting winding 34 arranged to be energized by a battery 35. Suitable switches 36 and 36' are provided for disconnecting the corresponding generators from the system.

As distinguished from synchronization by circulating currents, hydraulic synchronizing has the advantage of producing a corrective force which is approximately constant since it is determined by the reaction of the cylinder of an engine or engines the torque of which has not varied. These approximately constant corrective forces are incapable of establishing the periodic motions known as "hunting". Such periodic motions are due to the use of corrective devices in which the corrective force is approximately proportional to the displacement from normal position. When all the generators are operating at normal speed their respective stator members are in the positions illustrated and are in a state of static equilibrium with respect to each other due to the fact that equal torques are exerted upon the pistons by which these members are interconnected through the hydraulic system. Upon a decrease in the speed of generator 1, for example, due to misfiring of the engine 2 the torque supplied by this engine is decreased and the stator 6 is moved in a counterclockwise direction to close the circuit of relay 25 which accelerates the action of the governor 26 in admitting a fresh charge of fuel to the engine 2 through the valve 28. Simultaneously with this movement of the stator 6 the stator 6' of the generator 1' is moved in a clockwise direction to interconnect contacts 24' and energize the relay 29' which supplements the action of the governor 26' in shutting off the supply of fuel to the engine 2'. This movement of the rotor members is instantaneous and affords an effective means of equalizing the speeds of the different generators without producing the circulating currents ordinarily required to bring the machines into step with each other. A damping valve 15 is provided in the pipe 14 for the purpose of damping any hunting which may tend to be produced by these corrective operations My invention may be embodied in other forms than that shown and described and I, therefore, intend to cover by the appended claims all changes and modifications within the scope of my invention.

What I claim as new and desire to secure by Letters Patent of the United States, is:

1. A system of ship propulsion wherein a propeller motor is arranged to be supplied with current from a plurality of alternating current generators driven by prime movers subject to variations in speed and driving torque, comprising coupling means interconnecting the stator members of said generators and movable in response to a predetermined decrease in the torque exerted by one of said generators, and means operable in response to movement of said coupling means for increasing the torque of said low torque generator.

2. A system of ship propulsion wherein a propeller motor is arranged to be supplied with power from a plurality of alternating current generators each provided with a stator member arranged to rotate within a limited range and each driven by a prime mover subject to variations in its speed and driving torque, comprising a hydraulic coupling interconnecting the stator members of said generators and operable in response to a predetermined variation in the torque of one of said generators to rotate the stator member of said generator, and means responsive to the rotation of said member for accelerating the energization of the prime mover by which said generator is driven.

3. A system of ship propulsion wherein a propeller motor is arranged to be supplied with power from a plurality of alternating current generators each provided with a stator member arranged to rotate within a limited range and each driven by a prime mover subject to variations in its speed and driving torque, comprising coupling means interconnecting the stator members of said generators and operable in response to a predetermined increase in the torque of one of said generators to move the stator member of said generator, and means responsive to movement of said member for retarding the energization of the prime mover by which said generator is driven.

4. A system of ship propulsion wherein a propeller motor is arranged to be supplied with power from a plurality of alternating current generators each provided with a stator member arranged to rotate within a limited range and each driven by a prime mover subject to variations in its speed and driving torque, comprising coupling means interconnecting the stator members of said generators and operable in response to variations in the torque of one of said generators for moving the stator member of said generator in one direction when its torque exceeds a predetermined value and in the opposite direction when its torque decreases below a predetermined value, means responsive to the first mentioned movement of said stator member for decreasing the torque of said generator, and means responsive to the second mentioned movement of said member for increasing the torque of said generator.

5. A system of ship propulsion wherein a propeller motor is arranged to be supplied with power from a plurality of alternating current generators each provided with a stator member arranged to rotate within a limited range and each driven by a prime mover subject to variations in its speed and driving torque, comprising coupling means interconnecting the stator members of said generators and operable in response to variations in the torque of one of said generators for rotating the stator member of said generator in one direction when its torque decreases below a predetermined value and in the opposite direction when its torque exceeds a predetermined value, and means responsive to movement of said member for controlling the torque of said generator.

6. A system of ship propulsion wherein a propeller motor is arranged to be supplied with power from a plurality of alternating current generators each provided with a stator member arranged to rotate within a limited range and each driven by a prime mover subject to variations in its speed and driving torque, comprising coupling means interconnecting the stator members of said generators and operable in response to variations in the torque of one of said generators for rotating the stator member of said generator in one direction when its torque decreases below a predetermined value and in the opposite direction when its torque exceeds a predetermined value, means responsive to movement of said member for controlling the torque of said generator, and means operable in response to movement of all of said stator members in the same direction for controlling the sensitiveness of said coupling means.

7. A power system wherein a load motor is arranged to be supplied with current from a plurality of electric generators each provided with a stator member arranged to rotate within a limited range and each driven by a prime mover subject to variations in its speed and driving torque, comprising a hydraulic coupling interconnecting the stator members of said generators and operable in response to predetermined variations in the torque of any one of said generators for moving the stator member of said generator, means responsive to movement of said member in one direction for accelerating the energization of the prime mover by which said generator is driven, means responsive to movement of said member in the opposite direction for retarding the energization of said prime mover, and means responsive to movement of all said stator members in the same direction for increasing the pressure in said hydraulic coupling.

8. A power system wherein a load motor is arranged to be supplied with current from a plurality of electric generators each provided with a stator member arranged to rotate within a limited range and each driven by a prime mover subject to variations in its speed and driving torque, comprising means for controlling the supply of fuel to said prime movers, coupling means interconnecting the stator members of said generators and operable in response to predetermined variations in the torque of any one of said generators for moving the stator member of said generator, means responsive to movement of said member in one direction for accelerating the action of the corresponding fuel controlling means, and means responsive to movement of said member in the opposite direction for retarding the action of said fuel controlling means.

9. In a power system wherein a load motor is supplied with power from a plurality of alternating current generators each provided with a rotatable stator member, a mechanical coupling means interconnecting the stator members, and means for controlling the rate of distribution of energy between the generators through said mechanical coupling means.

10. The method of operating a plurality of parallel connected generators to prevent hunting which comprises supplying corrective energy at an approximately constant rate to each generator in accordance with its departure from the normal phase relation existing between said generators.

11. Apparatus for preventing hunting between a plurality of parallel connected generators which comprise means for interconnecting the stator members mechanically and responsive to variations in torque between said generators, and means operated by said first mentioned means for readjusting the energization of the prime movers by which the generators are driven to thereby restore the generators to normal phase relationship.

12. In a power system a plurality of parallel connected alternating current generators provided with rotatable stator members having a limited range of movement and mechanical coupling means interconnecting said stator members.

13. The method of operating a plurality of parallel connected alternating current generators to prevent hunting which comprises rotating the stators of the generators to restore the predetermined phase relationship, common to all generators, between the current systems of the stator and the rotor of each generator in accordance with departures from said predetermined phase relationship by applying corrective energy to said stator members at a rate which is independent of the amount of displacement to be corrected, while dissipating said energy during the corrective process proportionally to the magnitude of the corrective force required and to the rate at which it operates.

14. The method of operating a plurality of parallel connected alternating current generators to prevent hunting which comprises adjusting the energization of the prime movers by which said generators are driven in accordance with departures from a predetermined phase relationship, common to all generators, between the current systems of the stator and rotor of each generator to restore the generators to said predetermined phase relationship.

In witness whereof, I have hereunto set my hand this 26th day of April, 1922.

CAMPBELL MACMILLAN.